United States Patent [19]
Wettengel et al.

[11] Patent Number: 5,011,257
[45] Date of Patent: Apr. 30, 1991

[54] OPTICAL FIBER PATCH PANEL

[75] Inventors: Paul F. Wettengel, Ipswich; Kevin M. Bishop, Woodbridge, both of England

[73] Assignee: British Telecommunications public limited company, Great Britain

[21] Appl. No.: 469,554
[22] PCT Filed: Jun. 27, 1989
[86] PCT No.: PCT/GB89/00717
§ 371 Date: Mar. 23, 1990
§ 102(e) Date: Mar. 23, 1990
[87] PCT Pub. No.: WO90/00261
PCT Pub. Date: Jan. 11, 1990

[30] Foreign Application Priority Data
Jun. 29, 1988 [GB] United Kingdom ............... 8815446

[51] Int. Cl.$^5$ .............................. G02B 6/26
[52] U.S. Cl. ............... 350/96.20; 350/96.21; 350/96.22
[58] Field of Search ............. 350/96.20, 96.21, 96.22

[56] References Cited
U.S. PATENT DOCUMENTS 4,673,246 6/1987 Schembri ................ 350/96.22
4,728,171 3/1988 Schoffield et al. .......... 350/96.20
4,748,540 5/1988 Henneberg et al. .......... 361/424
4,792,203 12/1988 Nelson et al. .............. 350/96.20
4,818,054 4/1989 George et al. ............. 350/96.20
4,824,196 4/1989 Bylander .................. 350/96.20
4,962,989 10/1990 Jung et al. ............... 350/96.20

FOREIGN PATENT DOCUMENTS 0293183 of 0000 European Pat. Off. ...... 350/96.20 X
2570196 3/1986 France .................... 350/96.20 X
2166262 of 0000 United Kingdom .......... 350/96.20 X Primary Examiner—Brian Healy
Attorney, Agent, or Firm—Nixon & Vanderhye

[57] ABSTRACT

A patching panel (4) for housing multiple connections in an optical communication system. The panel is corrugated to define alternately disposed angled faces and apertures are provided on alternate faces (6) on each side of a central line parallel to the corrugations so that the ends of terminal connectors mounted in the patch panel are angled away from the center of the panel in a direction towards the nearest side of the panel. Preferably the angle progressively decreases towards the side. A flange extends from a frame supporting the patch panel on each side to prevent direct line of sight into a supported connector.

13 Claims, 2 Drawing Sheets

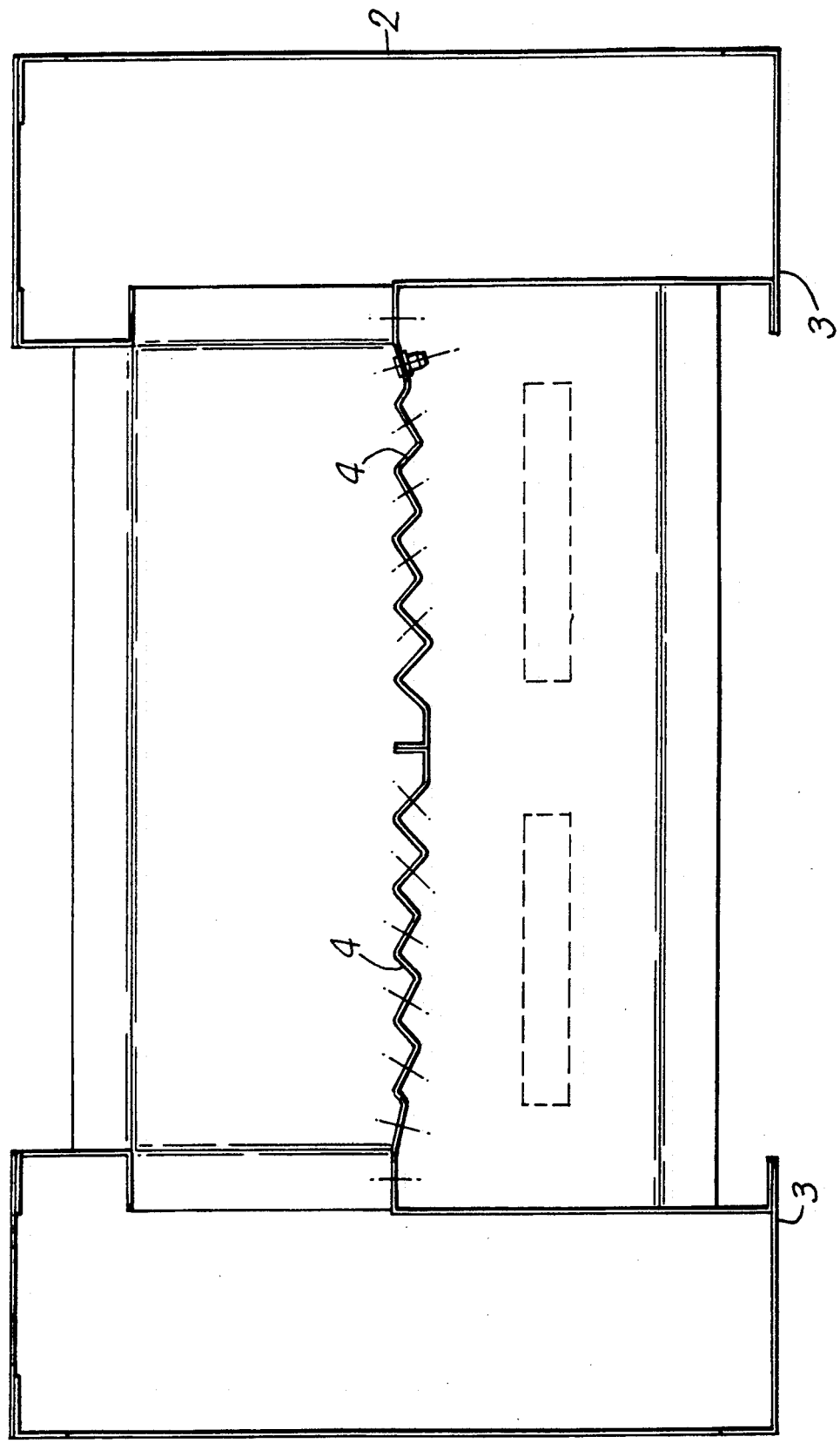

OPTICAL FIBER PATCH PANEL

BACKGROUND OF THE INVENTION

This invention relates to communication systems and especially to patch panel arrays for optical communication systems.

A patch panel is a housing for the connections between lines of a communication system, such as a connection between a main trunk line and a susbscriber line. Currently optical communication patch panels have a vertical panel having a two dimensional array of apertures for receiving the terminations of one set of lines on to which connectors for the lines to be connected can be attached. These panels are housed in cabinets.

There are two problems associated with this current arrangement. Firstly there is a limit to the density of the array that can be fitted on to the vertical panel and to the number of panels that can be located in a given cabinet. In exchanges having many lines, and especially in major cities where floor space is at a premium, it is desirable to minimise the space occupied by patch panels, or in other words it is desirable to increase the packing density of the connectors. The second problem that can arise is that when the connectors are disconnected it is possible to view directly into a potentially active line since, for reasons of access, the lines that are directly supported by the patch panel have their terminations inserted through the panel from the rear and face forwardly ready to receive a connector from the front. In normal operating circumstances it is unlikely that laser light signals emanating from an exposed line end would be harmful to the human eye when simply viewed with the naked eye, but if the light were viewed through or in conjunction with optical apparatus there may be a risk of damage.

SUMMARY OF THE INVENTION

The present invention is directed towards providing a patch panel which may accommodate a greater density of connectors and inhibits direct viewing into disconnected line terminals.

Accordingly the invention provides apparatus for supporting multiple line connections in an optical communication system, the apparatus comprising means for supporting a plurality of line connectors in a patching panel characterised in that the patching panel comprises a series of corrugations defining alternately disposed faces.

BRIEF DESCRIPTION OF THE DRAWING

The invention is now described by way of example with reference to the accompanying drawings in which:

FIG. 3 is a larger view of the patch panel.

DETAILED DESCRIPTION OF EXEMPLARY EMBODIMENTS

Figure 2:
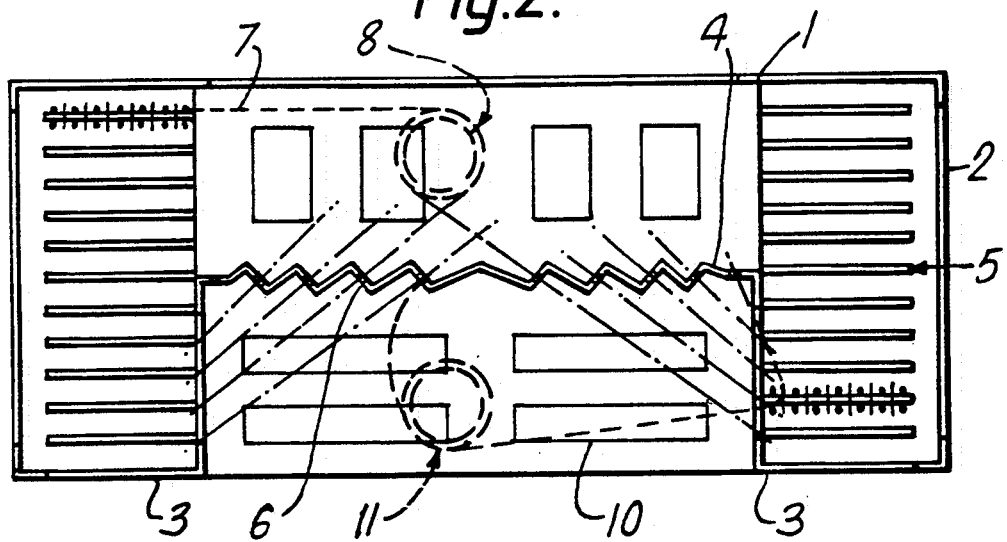
FIG. 2 is a view from above of a patch panel rack assembly according to a preferred embodiment of the invention.

Referring firstly to FIG. 2, a preferred patch panel assembly is shown which comprises a substantially rectangular section frame having a back wall 1, side walls 2 and front wall portions 3. The central part of the front of the frame between wall portions 3 is open to give access to a patch panel 4. The front of the frame may be open by virtue of a large central aperture leaving upper and lower front wall portions for support in addition to the side portions 3, or the entire central part of the front may be open from top to bottom between the wall portions 3. Adjacent to each side wall 2 there are fibre support trays 5 or fingers for separating and guiding the lines from individual connectors on the patch panel.

Figure 1:
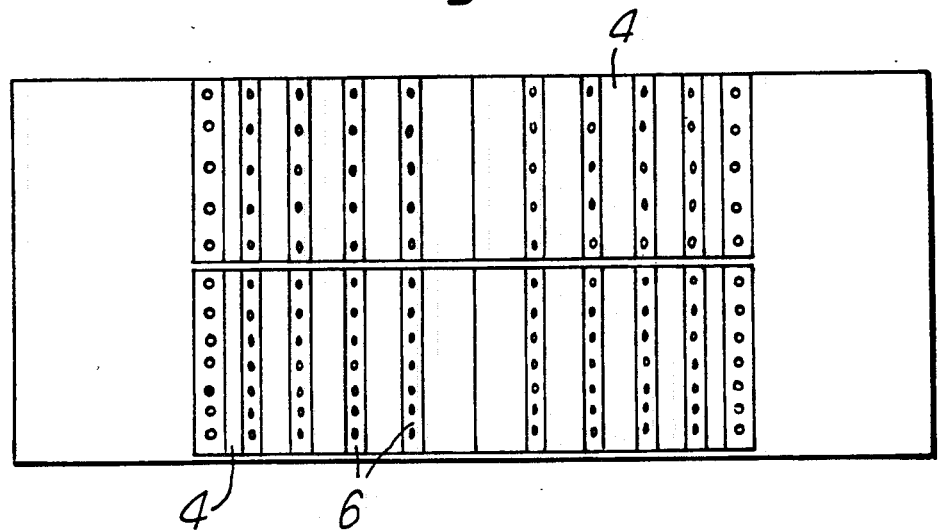
FIG. 1 is a frontal view of a patch panel according to a preferred embodiment of the invention.

It will be seen from FIG. 2 that the patch panel 4 is not a planar sheet as in the prior art, but has a zig zag corrugated section. Apertures for individual connectors are provided on alternate faces of the corrugations, as shown in FIG. 1. The faces with apertures, referenced 6, are those faces that, viewed from the front, are facing towards the nearest front corner of the frame (or more generally they are angled away from the centre towards the nearest side that runs parallel to the faces of the corrugations) giving rise to a change of direction at the centre. Fibre terminations, such as from a trunk line, are threaded through access ports in the side walls 2 and are supported on the fibre support fingers 5, as shown for fibre 7. This fibre termination is then coiled in a loop 8 and the terminal connector inserted into an aperture in the patch panel from the rear. In a similar manner a subscriber line, for example, is connected as shown for a fibre referenced 10, the line again entering through a port in the side wall, being supported by fibre support fingers, coiling in loop 11 and then being connected to a connector of an appropriate line in the patch panel. The fibre support fingers are generally arranged in layers, each layer serving several horizontal layers of the patch panel. An alternative fibre storage arrangement is for the fibres from each column of connectors to be wound on an individual reel. The front wall portions 3 are arranged to extend inwardly sufficiently far to prevent direct line of sight into the apertures of the patch panel or into exposed terminal connectors mounted in the panel. It is preferred for the angle of the faces with the apertures to progressively change, as seen more clearly in FIG. 3, at the centre the face being angled at about 45° to the front wall portions 3, and at the sides the final face being parallel or close to parallel with the front wall portions. Thus the angle between a perpendicular plane bisecting the central vertical plane of the patch panel (as viewed in FIG. 1) and the faces 6 progressively decreases, the angle between that plane and the connectors (viewed from the front) progressively decreases. This progressive change of angle of the faces enables the connectors at the sides to be more easily accessed.

The frames of the assemblies are arranged to be stackable, for example up to four units high, without the need for a cabinet. The units may stand on a plinth which both houses spare cable and makes the stacked assembly at a workable height. A convenient way to form the patch panel is to fabricate two similar corrugated panels and join them in the centre, as shown in FIG. 3, with one panel inverted to provide the mirror image configuration. Fanout arrangements other than an angular corrugation may be used, for example the angles may be rounded.

We claim:

1. Apparatus for supporting multiple line connections in an optical communication system, the apparatus comprising means for supporting a plurality of line connectors in a patching panel characterised in that the patching panel comprises a series of corrugations defining alternately disposed faces, and in which to each side of a central line on the patching panel parallel to the corrugations alternate faces are provided with apertures for receiving line connectors.

2. Apparatus for supporting multiple line connections in an optical communication system, the apparatus comprising means for supporting a plurality of line connectors in a patching panel characterised in that the patching panel comprises a series of corrugations defining alternately disposed faces, and in which the patching panel is disposed so that the ends of terminal connectors mounted in the panel are angled away from the centre of the panel in a direction towards the nearest side of the panel.

3. Apparatus for supporting multiple line connections in an optical communication system, the apparatus comprising means for supporting a plurality of line connectors in a patching panel characterised in that the patching panel comprises a series of corrugations defining alternately disposed faces, and in which the individual corrugations are asymmetric.

4. Apparatus for supporting multiple line connections in an optical communication system, the apparatus comprising means for supporting a plurality of line connectors in a patching panel characterised in that the patching panel comprises a series of corrugations defining alternately disposed faces, and in which the corrugations are of progressively shallower angle from the centre towards the sides of the patch panel.

5. Apparatus for supporting multiple line connections in an optical communication system, the apparatus comprising means for supporting a plurality of line connectors in a patching panel characterised in that the patching panel comprises a series of corrugations defining alternately disposed faces, and further comprising a frame for the patch panel, the frame being provided with means for inhibiting direct line of sight into the connector terminals.

6. A patch panel for effecting removable multiple optical signal line connections in an optical communication system comprising:

a panel for supporting multiple optical signal line connectors disposed within an operator access frame aperture having side walls;

said panel including faces for installation of said line connectors; and said faces being oriented in at least two different directions relative to said panel to cause optical signals exiting from any open connector to be intercepted by different portions of the panel structure and thus not projected into the eyes of a patch panel operator during normal patch panel use.

7. A patch panel as in claim 6 wherein said faces are disposed to cause optical signals exiting from an open connector to be intercepted by said side walls.

8. A patch panel as in claim 6 wherein said faces are disposed on one portion of the panel to angle toward one of said side walls and on another portion of the panel to angle toward another of said side walls.

9. A patch panel as in claim 6 wherein at least some of said faces are disposed at different angles than others.

10. A patch panel as in claim 6 wherein, to each side of a central line on the panel said faces are disposed on alternate sides of corrugations and include apertures for receiving said line connectors.

11. A patch panel as in claim 6 in which said faces are angled away from the center of the panel in a direction toward the nearest side of the panel.

12. A patch panel as in claim 6 wherein said faces are included in asymmetric corrugations formed in the panel.

13. A patch panel as in claim 12 wherein the corrugations are of progressively shallower angle from the centre toward the sides of the patch panel.

* * * * *